United States Patent
Ma et al.

(10) Patent No.: US 9,025,623 B2
(45) Date of Patent: May 5, 2015

(54) METHOD AND APPARATUS FOR IMPLEMENTING SELF-ADAPTION OF CROSS GRANULARITY IN OPTICAL TRANSPORT NETWORK

(75) Inventors: Ruimin Ma, Shenzhen (CN); Hongbing Zou, Shenzhen (CN); Haiping Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 129 days.

(21) Appl. No.: 13/700,637

(22) PCT Filed: Oct. 22, 2010

(86) PCT No.: PCT/CN2010/078044
§ 371 (c)(1),
(2), (4) Date: Nov. 28, 2012

(87) PCT Pub. No.: WO2011/150621
PCT Pub. Date: Dec. 8, 2011

(65) Prior Publication Data
US 2013/0089321 A1 Apr. 11, 2013

(30) Foreign Application Priority Data

Jun. 3, 2010 (CN) .......................... 2010 1 0191370

(51) Int. Cl.
*H04J 14/04* (2006.01)
*H04J 14/02* (2006.01)
(Continued)

(52) U.S. Cl.
CPC ............. *H04J 14/0227* (2013.01); *H04J 3/047* (2013.01); *H04J 3/1652* (2013.01); *H04J 2203/0046* (2013.01); *H04J 14/02* (2013.01)

(58) Field of Classification Search
CPC ........... H04J 3/1652; H04J 3/14; H04J 14/02; H04J 49/25; H04Q 11/00
USPC ........... 398/19, 45, 50, 58; 370/299, 481, 391
See application file for complete search history.

(56) References Cited

U.S. PATENT DOCUMENTS

| 7,286,487 B2 | 10/2007 | Perkins |
| 7,684,399 B2 | 3/2010 | Perkins |

(Continued)

FOREIGN PATENT DOCUMENTS

| CN | 101610430 A | 12/2009 |
| CN | 101616341 A | 12/2009 |
| CN | 101867850 A | 10/2010 |

OTHER PUBLICATIONS

International Search Report in international application No. PCT/CN2010/078044, mailed on Mar. 24, 2011.
(Continued)

*Primary Examiner* — Charles C Jiang
*Assistant Examiner* — Will Lin
(74) *Attorney, Agent, or Firm* — Oppedahl Patent Law Firm LLC (57) ABSTRACT

The disclosure relates to a method and apparatus for implementing self-adaption of cross granularity in an Optical Transport Network (OTN). The method includes: acquiring an optical interface side OTN service signal which has been processed by a frame-forming chip, and performing determination on the frame header of an Optical channel Data Unit (ODU) frame of the current level in the OTN service signal; when frame-alignment is determined to be successful, performing level-by-level de-multiplexing processing on the ODU frame of the current level to obtain cross granularities of different levels, selecting output channels for the cross granularities of different levels, performing mapping processing on the output cross granularities of different levels to form fixed rate service signals, and outputting the fixed rate service signals to back board ports, where the signals are transmitted to a cross board. By the disclosure, the cross granularity of a single board at the line side can be self-adaptively configured without occupying any OTN overhead, thus implementing normal communication without manually modifying the cross granularity of the single board at the line side when customer services change.

15 Claims, 7 Drawing Sheets

(51) Int. Cl.
*H04J 3/04* (2006.01)
*H04J 3/22* (2006.01)
*H04J 3/16* (2006.01)

(56) References Cited

U.S. PATENT DOCUMENTS

| 7,769,051 | B2 | 8/2010 | Perkins |
|---|---|---|---|
| 2004/0156325 | A1 | 8/2004 | Perkins |
| 2005/0286521 | A1 | 12/2005 | Chiang |
| 2008/0037984 | A1 | 2/2008 | Perkins |
| 2008/0044183 | A1 | 2/2008 | Perkins |
| 2010/0158519 | A1* | 6/2010 | Dong et al. ............... 398/45 |
| 2010/0177785 | A1* | 7/2010 | Kisaka et al. ............ 370/465 |
| 2012/0057870 | A1* | 3/2012 | Dong et al. ............... 398/52 |
| 2012/0251106 | A1* | 10/2012 | Valiveti et al. ............ 398/45 |

OTHER PUBLICATIONS

English Translation of the Written Opinion of the International Search Authority in international application No. PCT/CN2010/078044, mailed on Mar. 24, 2011.

* cited by examiner

METHOD AND APPARATUS FOR IMPLEMENTING SELF-ADAPTION OF CROSS GRANULARITY IN OPTICAL TRANSPORT NETWORK

TECHNICAL FIELD

The disclosure relates to the field of optical network communications, and more particularly to a method and apparatus for implementing self-adaption of cross granularity in an Optical Transport Network (OTN).

BACKGROUND

The OTN, which is a transport network based on Wavelength Division Multiplexing (WDM) technology on an optical layer organization network, is a new generation of "digital transport system" and "optical transport system" standardized by a series of recommendations from the International Telecommunication Union Telecommunication Standardization Sector (ITU-T), including G.872, G.709 and G.798 etc. The OTN can solve the problems of the lack of wavelength/sub-wavelength service scheduling ability of conventional WDM networks, and weak networking capability and protecting ability etc.

With the rapid development of data services, especially with the development of broadband and video services, new requirements have been made on transport networks of operators. A transport network should be able to adapt to the increasingly huge bandwidth. More importantly, the transport network is required to be able to perform service scheduling rapidly and flexibly and improve convenient network maintenance and management to meet service demands.

OTN technology includes a complete system structure of optical layers and electric layers. The network of each layer is provided with a corresponding managing and monitoring mechanism, and both the optical layers and the electric layers are provided with network survivability mechanisms. The circuit cross granularity can reach 1.25 G/2.5 G/10 G/40 G through the cross function of an OTN device based on an Optical channel Data Unit (ODUk), thus realizing flexible scheduling and protection of large-granule services. OTN technology provides a plurality of cross granularities, i.e. ODU0 (1.25 Gbit/s), ODU1 (2.5 Gbit/s), ODU2 (10 Gbit/s) and ODU3 (40 Gbit/s), and ODU4 which is being defined, to realize faster transmission of 40GE/100GE signals. High-speed cross granularities have higher cross efficiency, which enable devices to realize great cross connecting capability more easily, so that cost of devices can be reduced.

In the prior art, corresponding cross granularities are generally matched according to different rates of customer services in OTN cross devices. For a single board at the line side, although services of an optical interface are fixed OTN services which will not change along with changes of cross granularities, it is still needed to manually designate cross granularities by network managers to perform normal communication because of limitations of implementation mechanisms.

SUMMARY

The disclosure aims to provide a method and apparatus for implementing self-adaption of cross granularity in an OTN, so that the cross granularity of a single board at the line side can be self-adaptively configured without occupying any OTN overhead, thus implementing normal communication without manually modifying the cross granularity of the single board at the line side when customer services change.

The disclosure provides a method for implementing self-adaption of cross granularity in an Optical Transport Network (OTN), which includes the following steps:
acquiring an optical interface side OTN service signal which has been processed by a frame-forming chip, and performing determination on a frame header of an Optical channel Data Unit (ODU) frame of a current level in the OTN service signal;
performing level-by-level de-multiplexing processing on the ODU frame of the current level to obtain cross granularities of different levels when frame-alignment is determined to be successful;
selecting output channels for the cross granularities of different levels;
performing mapping processing on the output cross granularities of different levels to form fixed rate service signals, and outputting the fixed rate service signals to back board ports, where the fixed rate service signals are transmitted to a cross board.

Preferably, after acquiring the optical interface side OTN service signal which has been processed by the frame-forming chip and performing determination on the frame header of the ODU frame of the current level in the OTN service signal, the method may further include:
outputting a determination result and outputting cross granularity of the current level when frame-alignment is determined to be failed.

Preferably, the step of performing level-by-level de-multiplexing processing on the ODU frame of the current level to obtain the cross granularities of different levels when frame-alignment is determined to be successful may include:
when frame-alignment is determined to be successful, parsing out each lower-level ODU frame from the ODU frame of the current level and performing determination on the frame header of each parsed lower-level ODU frame respectively, and repeating this step to obtain the cross granularities of different levels.

The disclosure provides a method for implementing self-adaption of cross granularity in an OTN, which includes the following steps:
acquiring back board side fixed rate service signals sent by a cross board, and performing de-mapping processing on the fixed rate service signals to obtain an ODU frame of each level;
performing determination on the ODU frame of each level respectively;
performing, when frame-alignment of the ODU frame of a level is determined to be successful, multiplexing processing on the ODU frame of the level;
selecting an output channel for the multiplexed ODU frame;
outputting the multiplexed ODU frame to a frame-forming chip.

Preferably, after performing determination on the ODU frame of each level respectively, the method may further include:
determining, when frame-alignment of a first level ODUk frame-alignment module fails, the ODU frame to be an ODUk configured by default;
outputting an ODUk-Alarm Indication Signal (ODUk-AIS) to a downstream service processing unit.

The disclosure provides an apparatus for implementing self-adaption of cross granularity in an OTN, which includes:
a frame-alignment module, configured to acquire an optical interface side OTN service signal which has been processed by a frame-forming chip, and perform determination on a frame header of an Optical channel Data Unit (ODU) frame of a current level in the OTN service signal;

a multiplexing/de-multiplexing module configured to, when frame-alignment is determined to be successful, perform level-by-level de-multiplexing processing on the ODU frame of the current level to obtain cross granularities of different levels;

a main control selecting module configured to select output channels for the cross granularities of different levels;

a mapping/de-mapping module configured to perform mapping processing on the output cross granularities of different levels to form fixed rate service signals, and output the fixed rate service signals to back board ports, where the fixed rate service signals are transmitted to a cross board.

Preferably, the multiplexing/de-multiplexing module may be further configured to:

when frame-alignment is determined to be successful, parse out each lower-level ODU frame from the ODU frame of the current level and perform determination on the frame header of each parsed lower-level ODU frame respectively to obtain the cross granularities of different levels.

Preferably, the frame-alignment module may be further configured to, when frame-alignment is determined to be failed, output a determination result and output the cross granularity of the level.

Preferably, the main control selecting module may be an 8-line data selector.

The disclosure provides an apparatus for implementing self-adaption of cross granularity in an OTN, which includes:

a mapping/de-mapping module configured to acquire back board side fixed rate service signals sent by a cross board and perform de-mapping processing on the fixed rate service signals to obtain an ODU frame of each level;

a frame-alignment module configured to perform determination on the ODU frame of each level respectively; and when frame-alignment is determined to be successful, output the multiplexed ODU frame to a frame-forming chip;

a multiplexing/de-multiplexing module configured to, when frame-alignment of the ODU frame of a level is determined to be successful, perform multiplexing processing on the ODU frame of the level;

a main control selecting module configured to select an output channel for the multiplexed ODU frame.

Preferably, the main control selecting module may be further configured to, when frame-alignment of a first level ODUk frame-alignment module fails, determine the ODU frame to be an ODUk configured by default; and output an ODUk-Alarm Indication Signal (ODUk-AIS) to a downstream service processing unit.

Preferably, the main control selecting module may include: a Central Processing Unit (CPU) and a Field Programmable Gate Array (FPGA) register connected with the CPU; the FPGA register may be configured to, under the control of the CPU, select an output channel for the multiplexed ODU frame.

The disclosure performs level-by-level de-multiplexing processing on the ODU frame (signal) of each level in the OTN service signal, parses the ODU frame of each level into a cross granularity of the lowest level to obtain cross granularities of different levels, selects output channels for the cross granularities of different levels, performs mapping processing on the cross granularities of different levels and outputs the cross granularities of different levels in an uniform format. Therefore, with the disclosure, the cross granularity of a single board at the line side can be self-adaptively configured without occupying any OTN overhead, thus implementing normal communication without manually modifying the cross granularity of the single board at the line side when customer services change.

DETAILED DESCRIPTION

To make the technical solution of the disclosure clearer, detailed description will be made hereinafter in combination with the accompanying drawings.

With the technical solution of the disclosure, the cross granularity of a single board at the line side can be self-adaptively configured without occupying any OTN overhead, thus implementing normal communication without manually modifying the cross granularity of the single board at the line side when customer services change.

Figure 1:
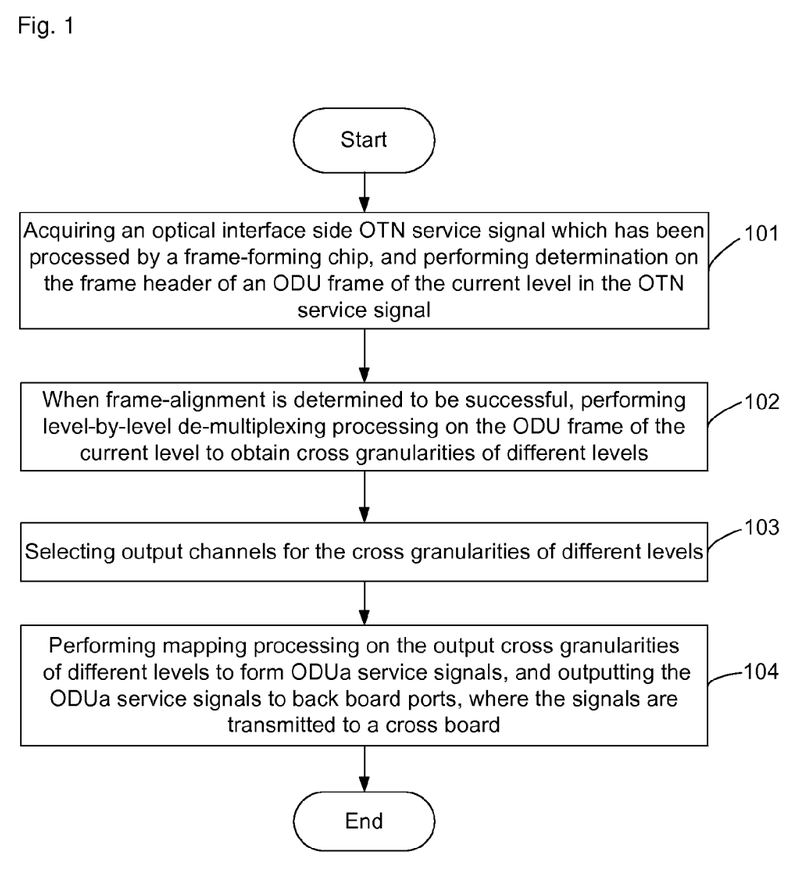
FIG. 1 is a flowchart of a method for implementing self-adaption of cross granularity in an OTN according to an embodiment of the disclosure.

FIG. 1 shows a flowchart of a method for implementing self-adaption of cross granularity in an OTN according to an embodiment of the disclosure. As shown in FIG. 1, the embodiment provides a method for implementing self-adaption of cross granularity in an OTN, the method includes the following steps.

Step 101: acquiring an optical interface side OTN service signal which has been processed by a frame-forming chip, and performing determination on the frame header of an ODU frame of the current level in the OTN service signal.

Step 102: when frame-alignment is determined to be successful, performing level-by-level de-multiplexing processing on the ODU frame of the current level to obtain cross granularities of different levels.

Step 103: selecting output channels for the cross granularities of different levels.

Step 104: performing mapping processing on the output cross granularities of different levels to form ODUa service signals, and outputting the ODUa service signals to back board ports, where the signals are transmitted to a cross board, wherein the ODUa service signals are fixed rate service signals.

Figure 2:
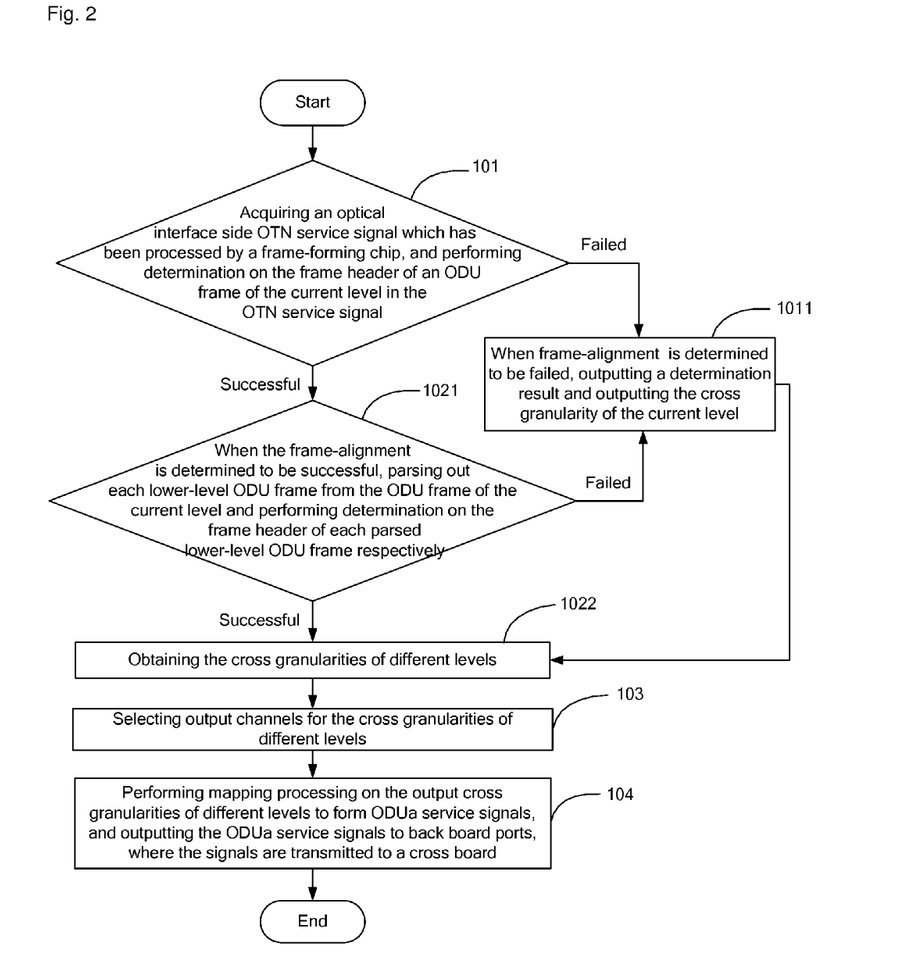
FIG. 2 is a flowchart of a method for implementing self-adaption of cross granularity in an OTN according to another embodiment of the disclosure.

FIG. 2 is a flowchart of a method for implementing self-adaption of cross granularity in an OTN according to another embodiment of the disclosure.

As shown in FIG. 2, the disclosure provides a method for implementing self-adaption of cross granularity in an OTN.

After Step 101 of the method in the embodiment as shown in FIG. 1, the following steps are further included.

Step 1011: when frame-alignment is determined to be failed, outputting a determination result and outputting the cross granularity of the current level.

In this embodiment, Step 102 specifically includes:

Step 1021: when the frame-alignment is determined to be successful, parsing out each lower-level ODU frame from the ODU frame of the current level and performing determination on the frame header of each parsed lower-level ODU frame respectively, and repeating this step; otherwise, performing Step 1011.

Step 1022: obtaining the cross granularities of different levels.

Figure 3:
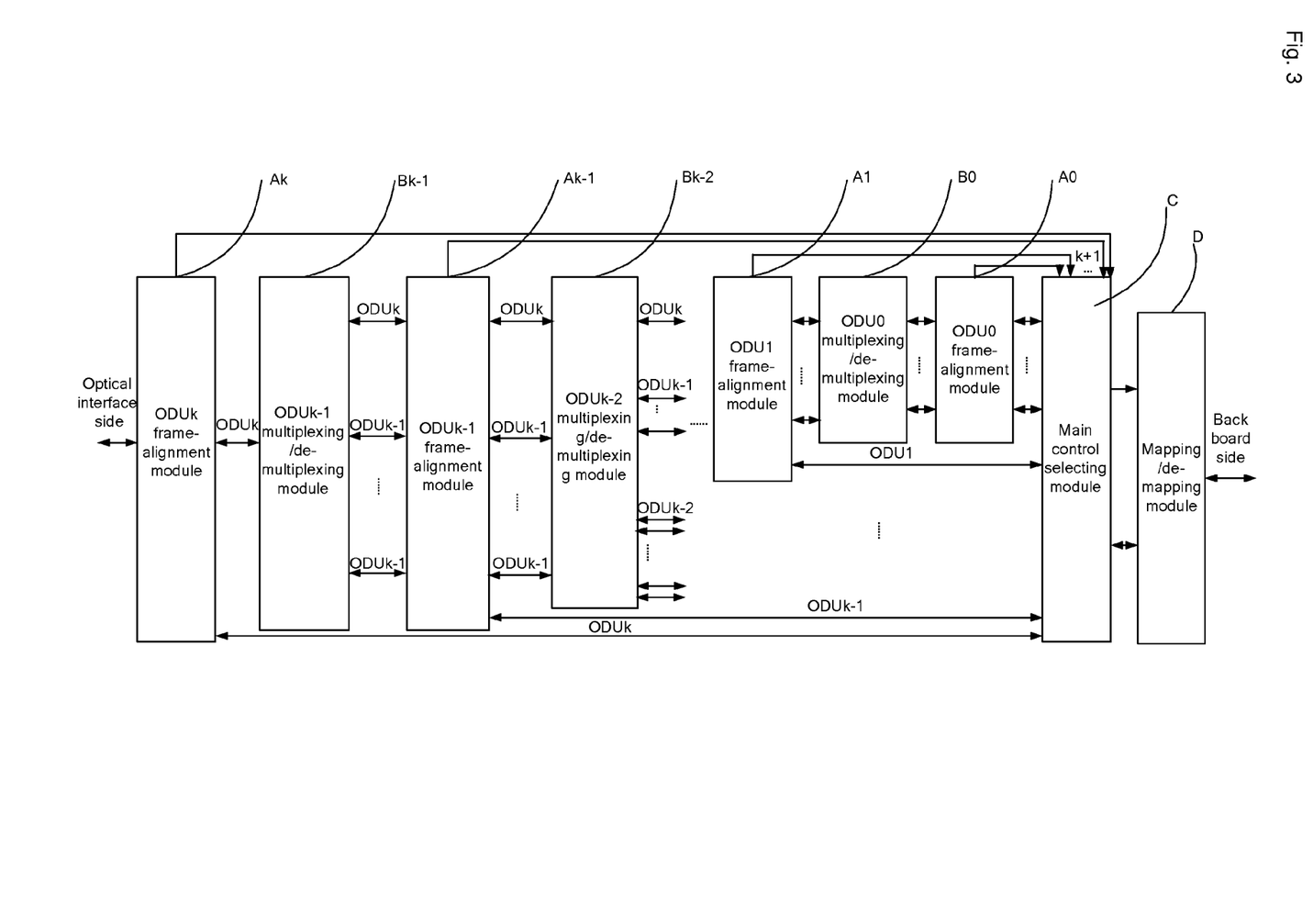
FIG. 3 is a structural diagram of an apparatus based on the method for implementing self-adaption of cross granularity in an OTN as shown in FIG. 2.

As shown in FIG. 3, the operation environment of the method for implementing self-adaption of cross granularity in an OTN provided by the embodiment of the disclosure is: an apparatus arranged between the optical interface side and the back board side on a single board at the line side is adopted. The apparatus includes:

a frame-alignment module, configured to acquire an optical interface side OTN service signal which has been processed by a frame-forming chip, and perform determination on the frame header of an ODU frame of the current level in the OTN service signal;

a multiplexing/de-multiplexing module configured to, when frame-alignment is determined to be successful, perform level-by-level de-multiplexing processing on the ODU frame of the current level to obtain cross granularities of different levels;

a main control selecting module C configured to select output channels for the cross granularities of different levels;

a mapping/de-mapping module D configured to perform mapping processing on the output cross granularities of different levels in order to form ODUa service signals, and output the ODUa service signals to back board ports, where the signals are transmitted to a cross board.

wherein the ODUa service signals are fixed rate service signals.

In the embodiment, the multiplexing/de-multiplexing module is further configured to:

when the frame-alignment is determined to be successful, parse out each lower-level ODU frame from the ODU frame of the current level and perform determination on the frame header of each parsed lower-level ODU frame respectively to obtain the cross granularities of different levels.

The frame-alignment module is further configured to, when frame-alignment is determined to be failed, output a determination result and output the cross granularity of the current level.

In the embodiment, the mapping/de-mapping module is further configured to acquire the back board side ODUa service signals sent by the cross board and perform de-mapping processing on the ODUa service signals to obtain an ODU frame of each level.

The frame-alignment module is further configured to perform determination on the ODU frame of each level respectively; and output the multiplexed ODU frame to the frame-forming chip when frame-alignment is determined to be successful.

The multiplexing/de-multiplexing module is further configured to, when frame-alignment of the ODU frame of a level is determined to be successful, perform multiplexing processing on the ODU frame of the level.

The main control selecting module C is further configured to select an output channel for the multiplexed ODU frame.

Further, the main control selecting module C is further configured to, when frame-alignment of a first level ODUk frame-alignment module fails, determine the ODU frame to be an ODUk configured by default; and output an ODUk-Alarm Indication Signal (ODUk-AIS) to a downstream service processing unit.

In the embodiment, the frame-alignment module and the multiplexing/de-multiplexing module may be a respective frame-alignment module and a respective multiplexing/de-multiplexing module configured for the ODU frame of each level. The ODUk represents the ODU frame of the $k^{th}$ level, wherein the value of k depends on the rate of an access service of the optical interface. When services OTU1, OTU2, OTU3 and OTU4 are accessed, the value of k is 1, 2, 3, 4 . . . , respectively, wherein an ODUk frame-alignment module Ak is an interface between the apparatus in the operation environment of the present method and the optical interface side OTN service signal which has been processed by the frame-forming chip.

The apparatus specifically consists of the ODUk frame-alignment module Ak, an ODUk−1 multiplexing/de-multiplexing module Bk−1, an ODUk−1 frame-alignment module Ak−1, an ODUk−2 multiplexing/de-multiplexing module Bk−2, . . . , an ODU1 frame-alignment module A1, an ODU0 multiplexing/de-multiplexing module B0, an ODU0 frame-alignment module A0, the main control selecting module C, and an ODUk<–>ODUa mapping/de-mapping module D, wherein the ODUk frame-alignment module Ak performs identification and determination on an ODUk frame header encapsulated therein and may output a frame-alignment result indication; the ODUk−1 multiplexing/de-multiplexing module Bk−1 may finish multiplexing processing between the ODUk frame and the ODUk−1 frame; the ODUk−1 frame-alignment module Ak−1 performs identification and determination on the frame header of the ODUk−1 frame and may output a frame-alignment result indication; the ODUk−2 multiplexing/de-multiplexing module Bk−2 finishes multiplexing processing among the ODUk frame, the ODUk−1 frame and the ODUk−2 frame; the ODU1 frame-alignment module A1 performs identification and determination on the frame header of the ODU1 frame and may output a frame-alignment result indication; the ODU0 multiplexing/de-multiplexing module B0 finishes multiplexing processing among the ODUk frame, the ODUk−1 frame, the ODU1 frame and the ODU0 frame; the ODU0 frame-alignment module A0 performs identification and determination on the frame header of the ODU0 frame and may output a frame-alignment result indication; the main control selecting module C performs determination according to the frame-alignment result indication output by each frame-alignment module and determines the final multiplexing processing path. The ODUk<–>ODUa mapping/de-mapping module D, which is an interface between the apparatus and a back board port, finishes mapping/de-mapping processing from ODUk to ODUa, and outputs ODUa service signals in an uniform format to the cross board through the back board port. The ODUa service signals are fixed rate service signals.

The method for implementing self-adaption of cross granularity in an OTN, provided in this embodiment, will be described in detail hereinafter. The method specifically includes the following steps.

Step 1: the ODUk frame-alignment module Ak performs determination on the ODUk frame header of the OTN service signal to be determined and outputs a frame-alignment result indication to the main control selecting module C. If the frame header is found, continue to perform Step 2, otherwise, frame-alignment of ODUk fails, and perform Step 8.

Step 2: the ODUk−1 multiplexing/de-multiplexing module Bk−1 parses out $n_{k-1}$ ODUk−1 frames from the ODUk frame while retaining an ODUk signal input in the previous level, and $1+n_{k-1}$ services are output in total ($n_{k-1}$ represents the maximum number of the ODUk−1 frames which can be encapsulated in the ODUk frame, e.g. $n_2=4$, $n_1=4$, $n_0=2$).

Step 3: if the value of k is 1, then go to Step 7. Otherwise, continue to perform Step 4.

Step 4: the ODUk−1 frame-alignment module Ak−1 performs determination on the signal parsed out by the ODUk−1 multiplexing/de-multiplexing module Bk−1 (the retained input signal of the previous level is only applied to lower level parsing, and is not directly applied to frame-alignment), and outputs a frame-alignment result indication to the main control selecting module C.

Step 5: the ODUk−2 multiplexing/de-multiplexing module Bk−2 parses out the ODUk−2 frames from the ODUk frame and ODUk−1 frame. The ODUk−1 frame which is aligned in the previous level successfully is parsed directly; while a corresponding time slot needs to be found in ODUk for the ODUk−1 frame which fails to be aligned in the previous level to parse out the ODUk−1 frame from the ODUk frame, thus ensuring that the total number of the finally parsed ODUk−2 is ($n_{k-1}*n_{k-2}$).

Step 6: deduct 1 from the value of k and go to Step 3.

Step 7: the ODU0 frame-alignment module A0 performs determination on the signal parsed out by the ODU0 multiplexing/de-multiplexing module B0 (the retained input signal of the previous level is only applied to lower level parsing, and is not directly applied to frame-alignment), and outputs a frame-alignment result indication to the main control selecting module C.

Step 8: the main control selecting module C synthesizes k+1 frame-alignment result indication signals, performs determination on cross granularities, and selects a correct parsing way according to the determination result to perform outputting. The determination is performed based on an ODUk cross granularity determination truth table, as shown in Table 1:

TABLE 1

| Frame-alignment module | ODUk | ODUk−1 | ... | ODU1 | ODU0 | Smallest cross granularity supported |
|---|---|---|---|---|---|---|
| Service number | 1 | 1 ... $n_{k-1}$ | ... | 1 ... $n_{k-1}*...*n_1$ | 1 ... $n_{k-1}*...*n_1*n_0$ | |
| Frame-alignment result (1 is success, 0 is failure) | 1 | 1 ... 1 | 1 ... 1 | 1 ... 1 | 1 ... 1 | ODU0 |

Note: ODUk level-by-level mapping; ODUk includes $n_{k-1}$ ODUk−1, ..., $n_{k-1}*...*n_1$ ODU1, $n_{k-1}*...*n_1 n_0$ ODU0, and the smallest cross granularity supported is ODU0.

| | 1 | 1 ... 1 | 1 ... 1 | 1 ... 1 | 1 ... 1 0 0 | ODU0 + ODU1 |

Note: ODUk level-by-level mapping; ODUk totally includes $n_{k-1}$ ODUk−1, ..., $n_{k-1}*...*n_1$ ODU1, $n_{k-1}*...*n_1 n_0 - n_0$ ODU0, the last ODU1 does not include ODU0, and the smallest cross granularity supported is ODU0 + ODU1.

| | 1 | 1 ... 1 | 1 ... 1 1 ... 1 | 1 | 0 ... 0 | ODU1 |

Note: ODUk level-by-level mapping; ODUk totally includes $n_{k-1}$ ODUk−1, ..., $n_{k-1}*...*n_1$ ODU1, ODU0 is not included in all ODU1 and the smallest cross granularity supported is ODU1.

| | 1 | 1 ... 1 | 1 ... 1 1 ... 1 | 0 0 ... 0 | 1 1 | ODU1 + ODU0 |

Note: ODUk includes $n_{k-1}$ ODUk−1, ..., $n_{k-1}*...*n_1 - 1$ ODU1, and $n_0$ ODU0, the last ODU2 directly includes 1 ODU1 and $n_0$ ODU0, there is skip-level mapping, and the smallest cross granularity supported is ODU1 + ODU0.

| | 1 | 1 ... 1 | 1 ... 1 1 ... 1 0 ... 0 | | 1 ... 1 | ODU0 |

Note: ODUk includes $n_{k-1}$ ODUk−1, ..., 0 ODU1, $n_{k-1}*...*n_1 n_0$ ODU0; each ODU2 directly includes $n_1*n_0$ ODU0; there is no ODU1; it is skip-level mapping and the smallest cross granularity supported is ODU0.

| | 1 | 1 ... 1 | 1 ... 1 0 ... 0 0 | ... 0 | 0 ... 0 | ODUk−1 |

Note: ODUk level-by-level mapping; ODUk includes $n_{k-1}$ ODUk−1.

| | 1 | 1 ... 1 | ... | ... | ... | ... |
| | 1 | 0 ... 0 | 1 ... 1 1 | 1 | 1 ... 1 | ODU0 |

Note: ODUk includes 0 ODUk−1, $n_{k-1}*n_{k-2}$ ODUk−2, ..., $n_{k-1}*...*n_1$ ODU1 and $n_{k-1}*...*n_1 n_0$ ODU0; each ODUk directly includes $n_{k-1}*n_{k-2}$ ODUk−2; there is no ODUk−1; it is skip-level mapping and the smallest cross granularity supported is ODU0.

| | 1 | 0 ... 0 | ... | ... | ... | ... |
| | 1 | 0 ... 0 | 0 ... 0 0 | 0 | 1 ... 1 | ODU0 |

Note: ODUk single level mapping; ODUk directly includes $n_{k-1}*...*n_1*n_0$ ODU0.

| | 1 | 0 ... 0 | 0 ... 0 0 | 0 | 0 ... 0 | ODUk |

Note: ODUk is directly sent to the back board without being parsed and the smallest cross granularity supported is ODUk.

| | 0 | 0 ... 0 | 0 ... 0 0 | 0 | 0 ... 0 | — |

Note: frame-alignment of ODUk fails, and the optical interface fails to receive correct service signals, and maintenance signals should be sent.

Step 9: when the transmission direction is from the optical interface to the back board, the ODUk<−>ODUa mapping/ de-mapping module D maps signals output by the main control selecting module C to be ODUa service signals which are fixed rate service signals and transmitted to the cross board via the back board ports, to finish the processing.

Compared with the prior art, the smallest cross granularity supported by correlated access OTN signals can be identified automatically without occupying the overhead according to the method and the apparatus of the disclosure, and the multiplexing/de-multiplexing processing can be performed on the smallest cross granularity automatically. In addition, the disclosure not only supports automatic granularity identification and automatic processing among apparatuses of the disclosure, but also supports automatic identification and automatic processing between the apparatuses of the disclosure and old non-automatic identification apparatuses. The disclosure greatly facilitates granularity identification and multiplexing processing when OTN signals are accessed to a cross scheduling system, thus having great practical value.

Figure 4:
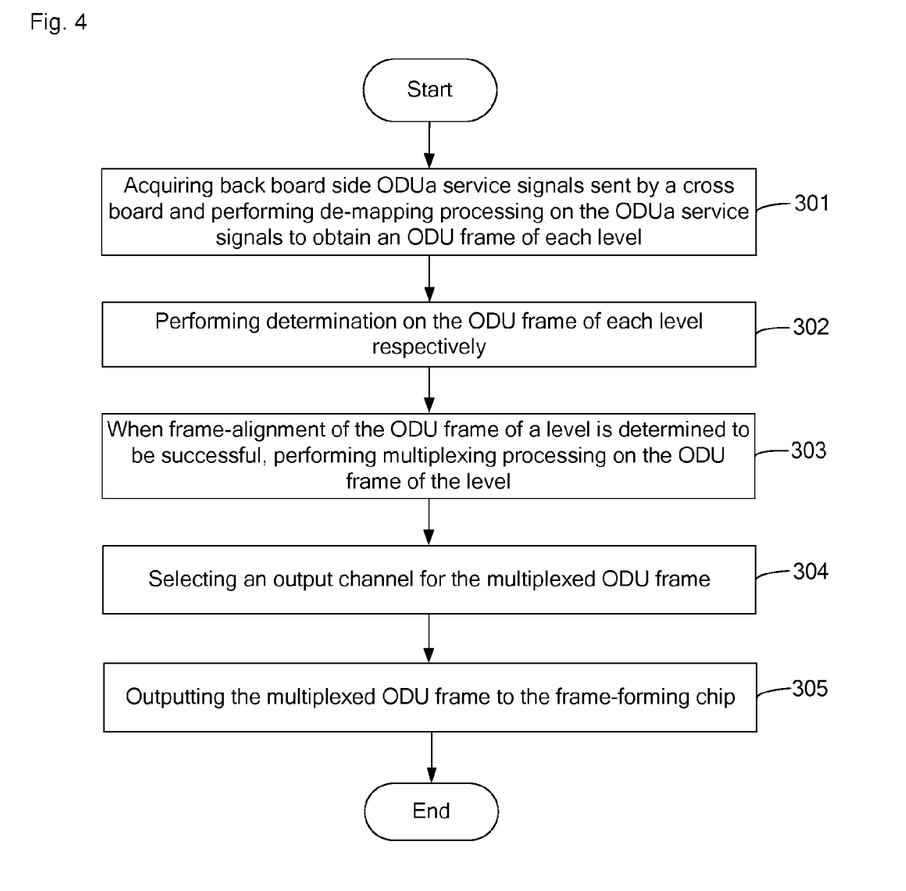
FIG. 4 is a flowchart of a method for implementing self-adaption of cross granularity in an OTN according to yet another embodiment of the disclosure.

FIG. 4 is a flowchart of a method for implementing self-adaption of cross granularity in an OTN according to yet another embodiment of the disclosure. As shown in FIG. 4, the disclosure provides a method for implementing self-adaption of cross granularity in an OTN, the method includes the following steps.

Step 301: acquiring the back board side ODUa service signals sent by the cross board and performing de-mapping processing on the ODUa service signals to obtain an is ODU frame of each level.

In this embodiment, the ODUa service signals are fixed rate service signals.

Step 302: performing determination on the ODU frame of each level respectively.

Step 303: when frame-alignment of the ODU frame of a level is determined to be successful, performing multiplexing processing on the ODU frame of the level.

Step 304: selecting an output channel for the multiplexed ODU frame.

Step 305: outputting the multiplexed ODU frame to the frame-forming chip.

Figure 5:
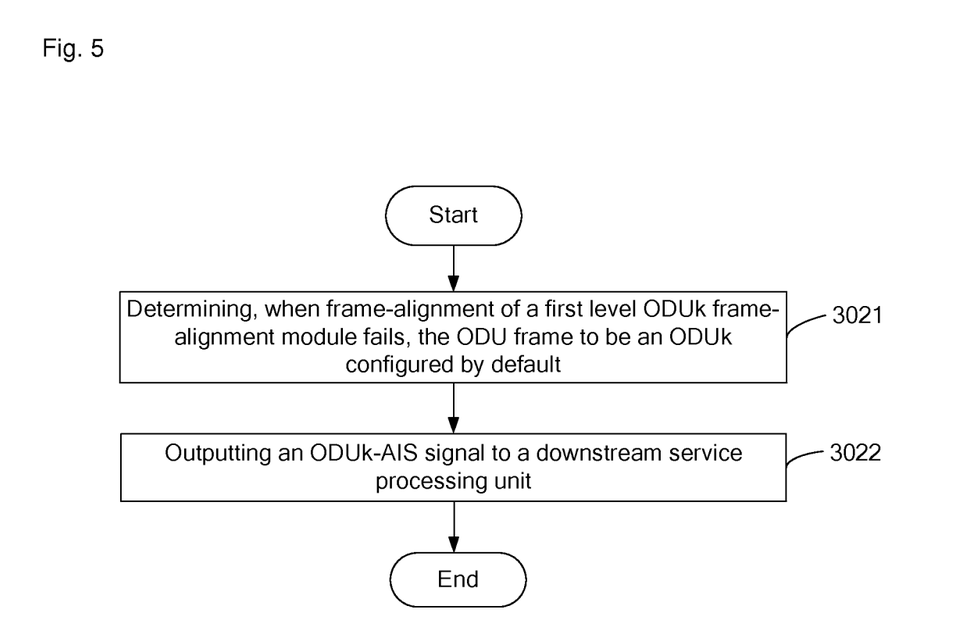
FIG. 5 is a flowchart of a method for implementing self-adaption of cross granularity in an OTN according to still another embodiment of the disclosure.

FIG. 5 is a flowchart of a method for implementing self-adaption of cross granularity in an OTN according to still another embodiment of the disclosure. As shown in FIG. 5, the disclosure provides a method for implementing self-adaption of cross granularity in an OTN, the method further includes the following steps after Step 302 of the method of the embodiment as shown in FIG. 3.

Step 3021: determining, when frame-alignment of a first level ODUk frame-alignment module fails, the ODU frame of the level to be an ODUk configured by default.

Step 3022: outputting an ODUk-AIS signal to a downstream service processing unit.

Figure 6:
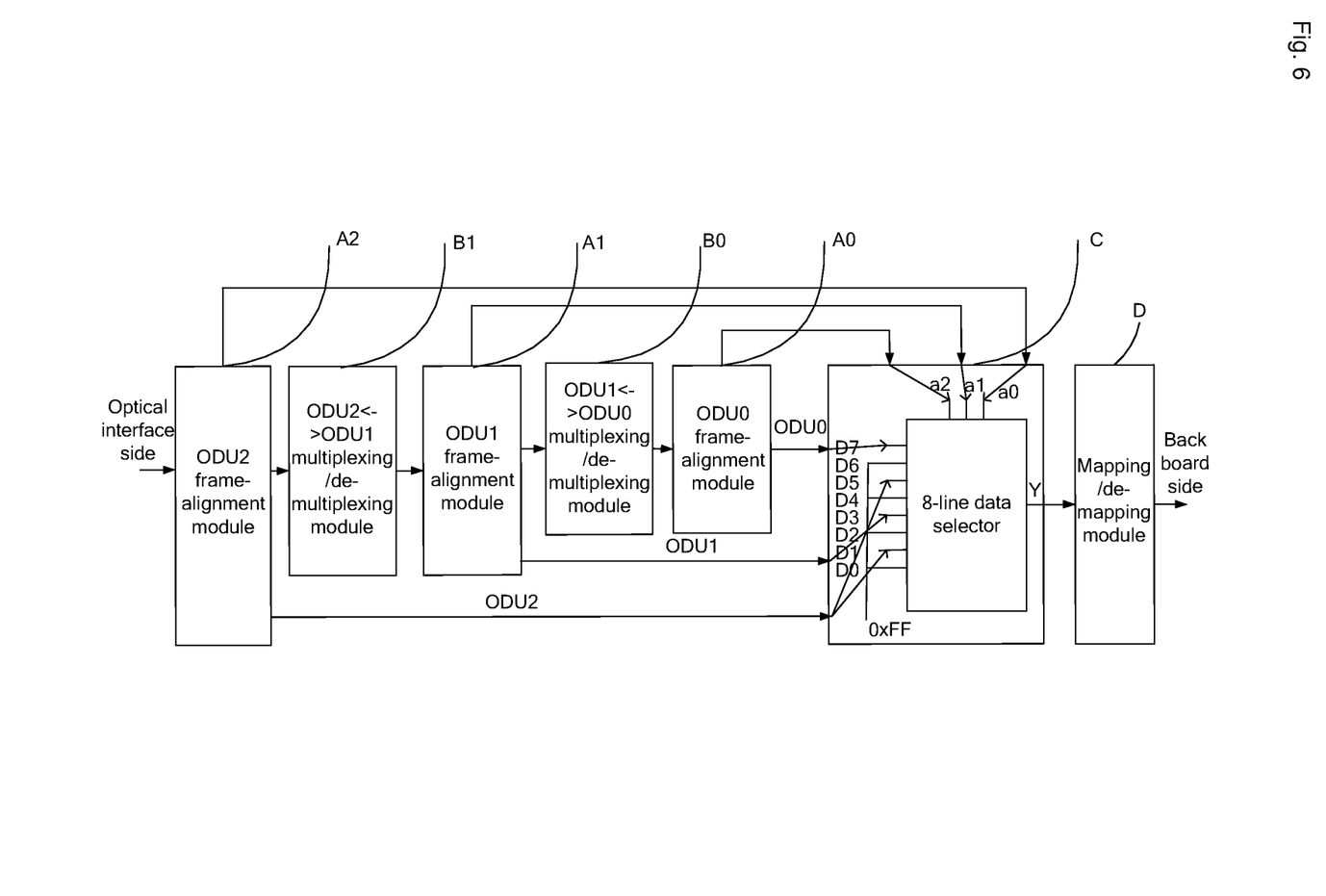
FIG. 6 is a structural diagram of an apparatus for implementing self-adaption of cross granularity in an OTN according to another embodiment of the disclosure.

FIG. 6 is a structural diagram of an apparatus for implementing self-adaption of cross granularity in an OTN according to another embodiment of the disclosure. As shown in FIG. 6, the disclosure provides an apparatus for implementing self-adaption of cross granularity in an OTN. The apparatus of this embodiment is based on the apparatus embodiment as shown in FIG. 3, wherein the value of k is 2 in this embodiment.

In this embodiment, the main control selecting module C is an 8-line data selector.

The apparatus of this embodiment is an OTN cross granularity self-adaption apparatus capable of performing ODU2 level-by-level mapping from the optical interface to the back board and incapable of supporting mixed granularity transport.

The optical interface side OTN service signal processed by the frame-forming chip enters the ODU2 frame-alignment module A2. Determination is performed on the ODU2 frame header of the OTN service signal to be determined, and a frame-alignment result indication is output to the main control selecting module C. The ODU2<->ODU1 multiplexing/de-multiplexing module B1 parses out the ODU1 frame from the ODU2 frame. The ODU1 frame-alignment module A1 performs determination on the parsed signal and outputs a frame-alignment result indication to the main control selecting module C. The ODU1<->ODU0 multiplexing/de-multiplexing module B0 parses out the ODU0 frame from the ODU1 frame, the ODU0 frame-alignment module A0 performs determination on the parsed signal and outputs a frame-alignment result indication to the main control selecting module C. The main control selecting module C is designed to be an 8-line data selector, and the determination is performed by using frame-alignment result indication signals of the three frame-alignment modules and correct signals are output. Mapping processing from ODUk to ODUa is performed on the output signals by the ODUk<->ODUa mapping/de-mapping module D to finish the processing.

The working method of the apparatus of this embodiment is described as follows: a self-adaption processing process is started after the apparatus is started. Data stream flows through the ODU2 frame-alignment module A2, the ODU2<->ODU1 multiplexing/de-multiplexing module B1, the ODU1 frame-alignment module A1, the ODU1<->ODU0 multiplexing/de-multiplexing module B0 and the ODU0 frame-alignment module A0 in turn. Frame-alignment result indication signals of the three frame-alignment modules are output to the main control selecting module C, which is designed to be an 8-line data selector. ODU2 data streams are guided to ports D1 and D5; ODU1 data streams are guided to port D3; ODU0 data streams are guided to port D7 and other ports are not used. The frame-alignment result indication signals of ODU2, ODU1, and ODU0 are guided to ports a0, a1 and a2, respectively. As shown in FIG. 6, if the cross granularity is ODU2 at the moment, then the values of the data streams of the ports a0, a1 and a2 are represented by: a2a1a0=001b or 101b in binary numbers; Y (output)=D1 or D5, and ODU2 signals are output successfully. If the cross granularity is ODU1 at the moment, then a2a1a0=011b, Y=D3 and ODU1 signals are output successfully. If the cross granularity is ODU0 at the moment, then a2a1a0=111b, Y=D7, and ODU0 signals are output successfully. When a2a1a0 is other values, ODU2-AIS signals are output in a unified manner. An ODU2 cross granularity determination truth table used by this embodiment is as shown in Table 2:

TABLE 2

| ODU0 frame-alignment result indication (0 indicates failure, 1 indicates success) | ODU1 frame-alignment result indication (0 indicates failure, 1 indicates success) | ODU2 frame-alignment result indication (0 indicates failure, 1 indicates success) | Cross granularity determination result | Signal processing result |
| --- | --- | --- | --- | --- |
| 0 | 0 | 0 | Invalid | ODU2-AIS |
| 0 | 0 | 1 | ODU2 | ODU2 frame |
| 0 | 1 | 0 | Invalid | ODU2-AIS |
| 0 | 1 | 1 | ODU1 | ODU1 frame |
| 1 | 0 | 0 | Invalid | ODU2-AIS |

TABLE 2-continued

| ODU0 frame-alignment result indication (0 indicates failure, 1 indicates success) | ODU1 frame-alignment result indication (0 indicates failure, 1 indicates success) | ODU2 frame-alignment result indication (0 indicates failure, 1 indicates success) | Cross granularity determination result | Signal processing result |
|---|---|---|---|---|
| 1 | 0 | 1 | ODU2 | ODU2 frame |
| 1 | 1 | 0 | Invalid | ODU2-AIS |
| 1 | 1 | 1 | ODU0 | ODU0 frame |

Mapping processing from ODUk to ODUa is performed on the output signals by the ODUk<->ODUa mapping/de-mapping module D and the output signals are sent to the cross board via the back board ports.

Figure 7:
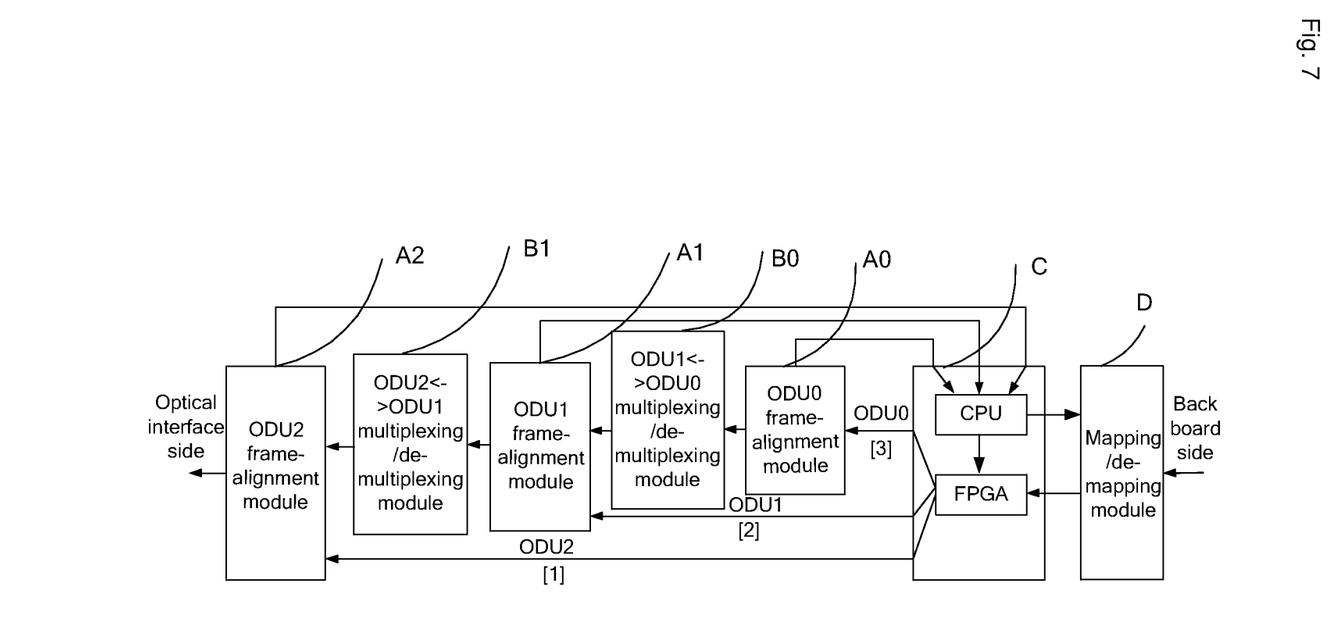
FIG. 7 is a structural diagram of an apparatus for implementing self-adaption of cross granularity in an OTN according to yet another embodiment of the disclosure.

FIG. 7 is a structural diagram of an apparatus for implementing self-adaption of cross granularity in an OTN according to yet another embodiment of the disclosure. The apparatus of this embodiment is based on the apparatus embodiment as shown in FIG. 3, wherein the value of k is 2 in this embodiment.

As shown in FIG. 7, the apparatus in this embodiment is an OTN cross granularity self-adaption apparatus capable of performing ODU2 level-by-level mapping from the back board to the optical interface and incapable of supporting mixed granularity transport.

In this embodiment, the main control selecting module C includes: a CPU and a Field Programmable Gate Array (FPGA) register connected with the CPU, wherein the FPGA register is configured to, under the control of the CPU, select an output channel for the multiplexed ODU frame.

De-mapping is performed, by the ODUk<->ODUa mapping/de-mapping module D, on the back board side ODUa service signals sent by the cross board and the de-mapping mode is set by the CPU in the main control selecting module C. After the CPU sets a de-mapping mode, the ODUk signals obtained after the de-mapping are output to a corresponding frame-alignment module and frame-alignment result indication fed back by the frame-alignment module is recorded. According to the feedback result of the respective frame-alignment module when three de-mapping modes (ODUa<->ODU2, ODUa<->ODU1, ODUk<->ODU0) are set respectively, the cross granularity of the back board signal is determined. The CPU sets the FPGA register according to the cross granularity and outputs the de-mapped signal to the corresponding channel. After being processed by the corresponding multiplexing/de-multiplexing module, the de-mapped signal is output to the optical interface, and sent to the frame-forming chip to perform subsequent overhead processing, and processing of the apparatus is ended.

The working method of the apparatus in this embodiment is described as follows: a self-adaption processing process is started after the apparatus is started. The CPU in the main control selecting module C sets the de-mapping mode to be ODUa<->ODU2 firstly, and outputs the ODU2 signal obtained after the de-mapping to the ODU2 frame-alignment module A2, if frame-alignment of ODU2 is fed back to be successful, then the cross granularity is determined to be ODU2, the de-mapped signal is output from channel [1] and the processing is ended; Otherwise, the de-mapping mode is adjusted to be ODUa<->ODU1, and the ODU1 signal obtained after the de-mapping is output to the ODU1 frame-alignment module A1; if frame-alignment of ODU1 is fed back to be successful, then the cross granularity is determined to be ODU1, the de-mapped signal is output from channel [1], subjected to multiplexing processing performed by the ODU2<->ODU1 multiplexing/de-multiplexing module B1, and output to the frame-forming chip and the processing is ended; otherwise, the de-mapping mode is adjusted to be ODUa<->ODU0, the ODU0 signal obtained after the de-mapping is output to the ODU0 frame-alignment module A0; if ODU0 frame-alignment is fed back to be successful, then the cross granularity is determined to be ODU0, the de-mapped signal is output from channel [2], subjected to multiplexing processing performed by the ODU1<->ODU0 multiplexing/de-multiplexing module B0 and the ODU2<->ODU1 multiplexing/de-multiplexing module B1, and output to the frame-forming chip and the processing is ended; otherwise, the cross granularity is determined to be ODU2 configured by default and ODU2-AIS signals are output to the frame-forming chip.

With the method and the apparatus provided by the embodiments of the disclosure, the smallest cross granularity supported by correlated access OTN signals can be identified automatically without occupying the overhead, and the multiplexing/de-multiplexing processing can be performed on the smallest cross granularity automatically. In addition, the disclosure not only supports automatic granularity identification and automatic processing among apparatuses of the disclosure, but also supports automatic identification and automatic processing between the apparatuses of the disclosure and old non-automatic identification apparatuses, thus greatly facilitating granularity identification and multiplexing processing when OTN signals are accessed to a cross scheduling system, thus having great practical value.

The above are only the preferred embodiments of the disclosure and not intended to limit the patent scope of the disclosure, and any equivalent structures or equivalent flow transformations based on the specification and the accompanying drawings of the disclosure, which is directly or indirectly applied in other related technical fields, shall similarly fall within the scope of patent protection of the disclosure.

The invention claimed is:
1. A method for implementing self-adaption of cross granularity in an Optical Transport Network (OTN), comprising the following steps:
   acquiring an optical interface side OTN service signal which has been processed by a frame-forming chip, and performing frame-alignment on an Optical channel Data Unit (ODU) frame of a current level in the OTN service signal, wherein performing frame-alignment on an ODU frame of a current level in the OTN service signal comprise: determining whether the frame header of the ODU frame of the current level in the OTN service signal is found; if the frame header is found the frame-alignment is determined to be successful; if the frame header is not found, the frame-alignment is determined to be failed;
   performing level-by-level de-multiplexing processing on the ODU frame of the current level to obtain smallest cross granularities supported by the OTN service signal when frame-alignment is determined to be successful;
   selecting output channels for the smallest cross granularities;
   performing mapping processing on the output smallest cross granularities to form fixed rate service signals, and outputting the fixed rate service signals to back board ports, where the fixed rate service signals are transmitted to a cross board.

2. The method according to claim 1, further comprising:
after acquiring the optical interface side OTN service signal which has been processed by the frame-forming chip and performing determination on the frame header of the ODU frame of the current level in the OTN service signal,
   outputting a determination result and outputting cross granularity of the current level when frame-alignment is determined to be failed.

3. The method according to claim 1, wherein the step of performing level-by-level de-multiplexing processing on the ODU frame of the current level to obtain the smallest cross granularities supported by the OTN service signal when frame-alignment is determined to be successful comprises:
   when frame-alignment is determined to be successful, parsing out each lower-level ODU frame from the ODU frame of the current level and performing determination on the frame header of each parsed lower-level ODU frame respectively, and repeating this step to obtain the smallest cross granularities.

4. The method according to claim 1, further comprising:
   acquiring a back board side fixed rate service signals sent by a cross board, and performing de-mapping processing on the fixed rate service signals to obtain an ODU frame of each level;
   performing determination on the ODU frame of each level respectively;
   performing, when frame-alignment of the ODU frame of a level is determined to be successful, multiplexing processing on the ODU frame of the level;
   selecting an output channel for the multiplexed ODU frame;
   outputting the multiplexed ODU frame to a frame-forming chip.

5. The method according to claim 4, further comprising:
after performing determination on the ODU frame of each level respectively,
   determining, when frame-alignment of a first level ODUk frame-alignment module fails, the ODU frame to be an ODUk configured by default;
   outputting an ODUk-Alarm Indication Signal (ODUk-AIS) to a downstream service processing unit,
   wherein the first level ODUk frame-alignment module is the result of execution on a processor of software stored in a memory.

6. An apparatus for implementing self-adaption of cross granularity in an Optical Transport Network (OTN), comprising:
   a processor and a memory, the memory stores a frame-alignment module, a multiplexing/de-multiplexing module, a main control selecting module and a mapping/de-mapping module, wherein
   the frame-alignment module is configured to acquire an optical interface side OTN service signal which has been processed by a frame-forming chip, and to perform frame-alignment on an Optical channel Data Unit (ODU) frame of a current level in the OTN service signal by the following manner: determining whether the frame header of the ODU frame of the current level in the OTN service signal is found, if the frame header is found the frame-alignment is determined to be successful; if the frame header is not found, the frame-alignment is determined to be failed;
   the multiplexing/de-multiplexing module is configured to, when frame-alignment is determined to be successful, perform level-by-level de-multiplexing processing on the ODU frame of the current level to obtain smallest cross granularities supported by the OTN service signal;
   the main control selecting module is configured to select output channels for the smallest cross granularities; and
   the mapping/de-mapping module is configured to perform mapping processing on the output smallest cross granularities to form fixed rate service signals, and to output the fixed rate service signals to back board ports, where the fixed rate service signals are transmitted to a cross board.

7. The apparatus according to claim 6, wherein the multiplexing/de-multiplexing module is further configured to:
   when frame-alignment is determined to be successful, parse out each lower-level ODU frame from the ODU frame of the current level and perform determination on the frame header of each parsed lower-level ODU frame respectively, and repeating this step to obtain the smallest cross granularities.

8. The apparatus according to claim 6, wherein the frame-alignment module is further configured to, when frame-alignment is determined to be failed, output a determination result and output the cross granularity of the level.

9. The apparatus according to claim 6, wherein the main control selecting module is an 8-line data selector.

10. The apparatus according to claim 6, wherein
   the mapping/de-mapping module is configured to acquire back board side fixed rate service signals sent by a cross board and perform de-mapping processing on the fixed rate service signals to obtain an ODU frame of each level;
   the frame-alignment module is configured to perform determination on the ODU frame of each level respectively, and to output the multiplexed ODU frame to a frame-forming chip when frame-alignment is determined to be successful;
   the multiplexing/de-multiplexing module is configured to, when frame-alignment of the ODU frame of a level is determined to be successful, perform multiplexing processing on the ODU frame of the level; and
   the main control selecting module is configured to select an output channel for the multiplexed ODU frame.

11. The apparatus according to claim 10, wherein
the main control selecting module is further configured to, when frame-alignment of a first level ODUk frame-alignment module fails, determine the ODU frame to be an ODUk configured by default; and
output an ODUk-Alarm Indication Signal (ODUk-AIS) to a downstream service processing unit.

12. The apparatus according to claim 10, wherein
the main control selecting module comprises: a Central Processing Unit (CPU) and a Field Programmable Gate Array (FPGA) register connected with the CPU; the FPGA register is configured to, under the control of the CPU, select an output channel for the multiplexed ODU frame.

13. The apparatus according to claim 7, wherein the main control selecting module is an 8-line data selector.

14. The apparatus according to claim 8, wherein the main control selecting module is an 8-line data selector.

15. The apparatus according to claim 11, wherein
the main control selecting module comprises: a Central Processing Unit (CPU) and a Field Programmable Gate Array (FPGA) register connected with the CPU; the FPGA register is configured to, under the control of the CPU, select an output channel for the multiplexed ODU frame.

* * * * *